Patented Sept. 17, 1935

2,014,900

UNITED STATES PATENT OFFICE 2,014,900

PROCESSING COTTON SEED HULLS FOR USE AS A LITTER

William H. Lapp, Nevada, Iowa

No Drawing. Application August 31, 1934, Serial No. 742,359

8 Claims. (Cl. 119—1)

This invention relates to the processing of cotton seed hulls for use as a litter for poultry, live stock, etc.

An object of the invention is to provide a litter suitable for poultry and live stock through the processing of cotton seed hulls. Other specific objects and advantages will appear as the specification proceeds.

A satisfactory litter should possess the following qualities. It should be sanitary, absorbent, free from moulds and dust, and durable. It should retain heat. It should not be a food for the animal for which its serves as a litter. It should not retain or absorb filth, and it should not burn readily.

I have found that a litter meeting the above requirements can be satisfactorily produced through the processing of cotton seed hulls.

Raw or untreated cotton seed hulls are unsatisfactory for use as a litter for a number of reasons. The hull is provided with a number of lint filaments which are provided with forked branches. Such lint structure forms a web about the hull which causes it to stick to the feet of birds, etc. In a short time, a mass of such material forms on the feet of the birds making it difficult for them to walk and causing a portion of the litter to be carried away every time that the bird leaves the litter. The untreated hull is also unsatisfactory because it is eaten by chickens. Other reasons will appear as the process is described in detail.

I have discovered that by treating the cotton seed hulls at an elevated temperature in contact with pine oil and turpentine, that the web attached to the hulls can be converted into a hair or filament-like structure without branches, so that there is no tendency for the hulls to stick to the feet of the birds. Incidentally, the pine oil is repellent to mites, and the turpentine is also an aid to the pine oil in overcoming undesirable properties in the raw cotton hulls. To the solution containing pine oil and turpentine, I prefer to add formaldehyde, which reduces the possibility of mould development in the litter, and, particularly, the mould of aspergillus which is so disastrous to poultry. The formaldehyde also has antiseptic properties which are beneficial in making the litter sanitary.

In order to prevent the poultry from eating the hulls, I treat the hulls at an early stage with a material distasteful to the poultry such as, for example, quinine sulphate. I prefer to spray the quinine sulphate onto the hulls in sufficient quantity to cover all the lint and hulls. Before the product can be treated with the solution of pine oil, turpentine and formaldehyde, I find it is necessary to allow the quinine-sulphate-treated hulls to stand for a considerable period of time, say several days. After this period, I find that the hulls can be treated satisfactorily with the pine oil, turpentine and formaldehyde solution. I prefer to introduce the pine oil and turpentine separately, the turpentine normally contained in pine oil having been already separated. In this way, I know the exact quantity of pine oil and exact quantity of turpentine added. If desired, the turpentine may be omitted or some substitute employed.

In the treatment with the latter solution, any suitable means for heating the mass of hulls in contact with the oil solution may be employed. I prefer to treat them in a cylinder containing several agitators, the cylinder being heated to a temperature around 80° F. The hulls treated in this manner completely lose the tenacious web which formerly surrounded them, and the resultant hair or filament-like appendages to the hulls have no tendency to stick to the feet of the poultry.

To reduce the fire hazard, the hulls may be treated in a solution of bicarbonate of soda. After such treatment, the material may smoulder after being ignited, but it will not blaze.

As a specific example of my process, the following may be stated:

The hulls are first treated with a solution containing quinine sulphate, the quinine sulphate being sprayed onto the hulls in a quantity sufficient to cover all the lint and hulls. The treated product is then allowed to stand for several days. It is then treated in a cylinder equipped with agitators, the cylinder being heated to 80° F., and a solution of pine oil, turpentine and formaldehyde is mixed by the agitators with the hulls. The proportions of the pine oil, turpentine and formaldehyde may be varied considerably. They may be employed in equal parts or, if desired, the proportions may be changed considerably while still producing good results. It is sufficient that the pine oil be present in a sufficient quantity to convert the web about the cotton seed into straight filaments, and it is sufficient that the formaldehyde be present in such quantity as to prevent the formation of moulds and render the litter sanitary.

The quinine sulphate forms an under-coating on the hulls which does not interfere with the outer pine oil etc. coating, but which is effective in preventing the birds from eating the hulls.

It will be understood that some of the constituents of the solution may be omitted and other well known chemicals equal in effect to those enumerated may be substituted readily by those skilled in the art and, in the appended claims, I intend to cover not only the materials recited in the claims but the well known equivalents of such materials.

The foregoing detailed description has been given for clearness of understanding only, and no unnecessary limitations should be understood therefrom, but the appended claims should be construed as broadly as permissible, in view of the prior art.

I claim:

1. In a process for treating cotton seed hulls to adapt them for use as a litter for poultry and live stock, the step of applying pine oil to the hulls to convert the lint web of the hulls into hair-like unbranched filaments which do not tend to cling to the feet of said poultry and live stock.

2. In the method of processing cotton seed hulls for use as a litter for poultry and live stock, the step of agitating cotton seed hulls at an elevated temperature in the neighborhood of 80° F. and in contact with pine oil which converts the lint web of the hulls into hair-like non-adhering filaments.

3. A method for processing cotton seed hulls for use as a litter for poultry and live stock comprising: treating the hulls with a solution containing quinine sulphate to make the hulls bitter in taste, allowing the hulls to stand for a period, and then treating the hulls with a solution containing pine oil and formaldehyde.

4. A method for processing cotton seed hulls for use as a litter for poultry and live stock comprising: treating the hulls with a solution containing quinine sulphate to make the hulls bitter in taste, allowing the hulls to stand for several days, and then treating the hulls with a solution containing pine oil, turpentine and formaldehyde.

5. A method for processing cotton seed hulls for use as a litter for poultry and live stock comprising: treating the hulls with a solution of quinine sulphate to make the same bitter, allowing the hulls to stand for a period, then agitating the hulls at an elevated temperature in the neighborhood of 80° F. in contact with pine oil, turpentine and formaldehyde, and then treating the hulls with a solution of sodium bicarbonate.

6. A litter for poultry and livestock, comprising: cotton seed hulls having their lint webs converted into hair-like unbranched filaments with substantially no tendency to adhere to the feet of said poultry or live stock.

7. A litter for poultry and live stock, comprising: cotton seed hulls containing an inner coating of quinine sulphate and an outer coating of pine oil.

8. A litter for poultry and live stock, comprising: cotton seed hulls having an inner coating of quinine sulphate and an outer coating of pine oil, turpentine and formaldehyde.

WILLIAM H. LAPP.